United States Patent [19]

Inada et al.

[11] Patent Number: 5,053,273

[45] Date of Patent: Oct. 1, 1991

[54] MAGNETIC POWDER COATED WITH A COPOLYMER OF POLYOXYETHYLENE ALLYL METHYL DIETHER AND MALEIC ANHYDRIDE

[75] Inventors: Yuji Inada, Tokyo; Yutaka Tamaura, Yokohama; Katsunobu Takahashi, Tokyo, all of Japan

[73] Assignee: Mihama Corporation, Osaka, Japan

[21] Appl. No.: 256,056

[22] Filed: Oct. 11, 1988

[51] Int. Cl.$^5$ .......................... B32B 5/16; G11B 23/00
[52] U.S. Cl. .................... 428/323; 428/329; 428/403; 428/461; 428/407; 428/694; 428/900; 427/128; 427/372.2
[58] Field of Search .............. 428/900, 694, 407; 427/372.2, 128; 360/131, 134, 135

[56] References Cited

U.S. PATENT DOCUMENTS

| | | |
|---|---|---|
| 4,200,680 | 4/1980 | Sasazawa et al. ............... 428/403 |
| 4,407,901 | 10/1983 | Miyatsuka et al. .............. 428/694 |
| 4,562,117 | 12/1985 | Kikukawa et al. .............. 428/407 |

FOREIGN PATENT DOCUMENTS

| | | |
|---|---|---|
| 0363534 | 11/1988 | European Pat. Off. . |
| 64-000109 | 1/1989 | Japan . |
| 1-043513 | 2/1989 | Japan . |
| 2-053221 | 2/1990 | Japan . |

*Primary Examiner*—Paul J. Thibodeau
*Assistant Examiner*—Stevan A. Resan
*Attorney, Agent, or Firm*—Frishauf, Holtz, Goodman & Woodward

[57] ABSTRACT

A magnetic powder treated with a coating agent, wherein the surface of the magnetic powder is coated with an alternating copolymer comprising a polyoxyethylene allyl methyl diether and maleic anhydride. An aqueous coating material containing the magnetic powder and a magnetic recording medium prepared by use of the magnetic powder. The magnetic powder of the present invention has a good dispersibility. The aqueous coating material containing the magnetic powder allows for coating under a simple and safe environment. Also the magnetic recording medium prepared by the use of magnetic powder exhibits excellent magnetic characteristics.

20 Claims, 2 Drawing Sheets

MAGNETIC POWDER COATED WITH A COPOLYMER OF POLYOXYETHYLENE ALLYL METHYL DIETHER AND MALEIC ANHYDRIDE

BACKGROUND OF THE INVENTION

1. Field of the Invention

This invention relates to magnetic powder having good dispersibility to be utilized for magnetic recording medium, an aqueous coating material containing the magnetic powder which enables coating under a simple and good environment, and also a magnetic recording medium exhibiting excellent magnetic characteristics.

2. Background Information

There has been an increasing demand in the prior art to use magnetic recording medium for uses such as magnetic tape, such as sound recording tape, video tape, etc., floppy discs or magnetic cards; and also various studies have been done to enhance area recording density with an increase in the amount of information to be magnetically recorded.

Whereas, for effecting an increase in magnetic recording density in the coating type recording medium most generally employed at the present time, it is effective to make the magnetic material particles smaller to be fixed by coating onto the surface of a support (e.g., tape) by the use of a binder, and it has been well known in the art that a coating material containing such highly dispersed magnetic powder which enables enhancement of magnetic powder density per unit area of film tape and high orientation will lead to a higher densification of recording.

Some problems have been encountered in employing magnetic fine powder in magnetic recording media.

That is, the magnetic powder to be fixed by coating on the support surface by use of a binder exhibit generally low wettability to a binder solution and also exhibits a magnetic agglomerating tendency and one may consider to impart high dispersibility to the magnetic powder in the binder solution in producing a magnetic recording medium exhibiting a high magnetic recording density as mentioned above. However, in magnetic powder which is frequently used as particles generally of some 10 μm or less, the problem of agglomeration of particles, etc. will occur, and therefore it is not easy to obtain a uniform highly dispersed state in a solution.

In order to solve the problems as described above, for the purpose of improving wettability and magnetic agglomerating tendency for the binder solution and ensuring necessary characteristics as the magnetic recording medium (angular ratio, luster, sensitivity dB, noise dB), it has been generally practiced to add a dispersing agent in the above coating material (binder solution containing magnetic powder). However, the use of a large amount of a dispersing agent for the purpose of poor dispersion accompanied with fine particulation of magnetic powder as described above may cause a deterioration in magnetic characteristics; and also dispersibility of the magnetic fine powder cannot be necessarily improved if even such a large amount of the dispersing agent may be mixed therewith.

Accordingly, for the purpose of improving dispersibility of the magnetic powder, it has been considered to impart high dispersibility in a binder solution by modifying the surface of the magnetic powder.

As the method of such surface treatment for powder is known in general, there may be included utilization of inorganic materials (silicon, titanium, zirconium, aluminum, chromium, etc.), utilization of organic materials (fatty acid, amine, amide, silane coupling agent, etc.), polymerization of monomer on the magnetic powder (acryl, epoxy, etc.) and others. However, in the case of magnetic fine powder which has a strong magnetic agglomerating tendency, surface treatment of good efficiency can be achieved only with difficulty, and therefore there is the problem that it cannot be utilized as such.

Further, the steps of producing the magnetic tape which form the magnetic layer on a base film are broadly classified into the step of forming a coating material in which a coating material is made by dispersing the mixture selected and prepared from various materials as mentioned above into an organic solvent (generally toluene) and the coating step in which the coating material made in the coating material forming step is applied onto the surface of a predetermined substrate. In the latter step, included are the step of passing through the magnetic field for orientation of magnetic powder and the drying step for drying the coating material. Also, in the former coating material forming step, since dispersibility of magnetic powder in water, toluene, etc. has a great influence in the determination of the characteristics of the magnetic tape prepared, its improvement has been sought.

In production of magnetic tapes, etc. of the prior art as described above, an organic solvent such as toluene has been used in the coating material containing magnetic powder as described above, and therefore it is necessary to consider the working environment or waste-liquor disposal instruments in the coating material forming step or the coating step, whereby there is the drawback that these points are reflected in the cost of the product, and there was also the problem of the deleterious influence on the environment.

SUMMARY OF THE INVENTION

Accordingly, the present inventors have studied intensively in order to provide a magnetic recording medium of a high function having an excellent magnetic recording density by making it possible to disperse highly magnetic powder in an aqueous coating material without addition of a dispersing agent.

Thus, an object of the present invention is to provide a novel coating magnetic powder which exhibits good dispersibility in an aqueous solution, and to provide an aqueous coating material containing magnetic powder which has made it possible to highly disperse said magnetic powder without the use of a dispersing agent, thereby enabling improvement of the working environment, alleviation of waste-liquor disposal installations, etc.

Still another object of the present invention is to provide a magnetic recording medium capable of forming a coating type magnetic layer which can exhibit a high angular ratio of 0.9 or higher as compared with the magnetic recording medium of the prior art.

The present invention provides magnetic powder coated on the surface thereof with an alternating copolymer of a polyoxyethylene allyl methyl diether and maleic anhydride, an aqueous coating material comprising the above magnetic powder in a binder liquid composed mainly of an acrylic resin and water, and also a magnetic recording medium obtained by coating and drying of the above aqueous coating material on the surface of a substrate.

DESCRIPTION OF THE PREFERRED EMBODIMENT

Figure 1:
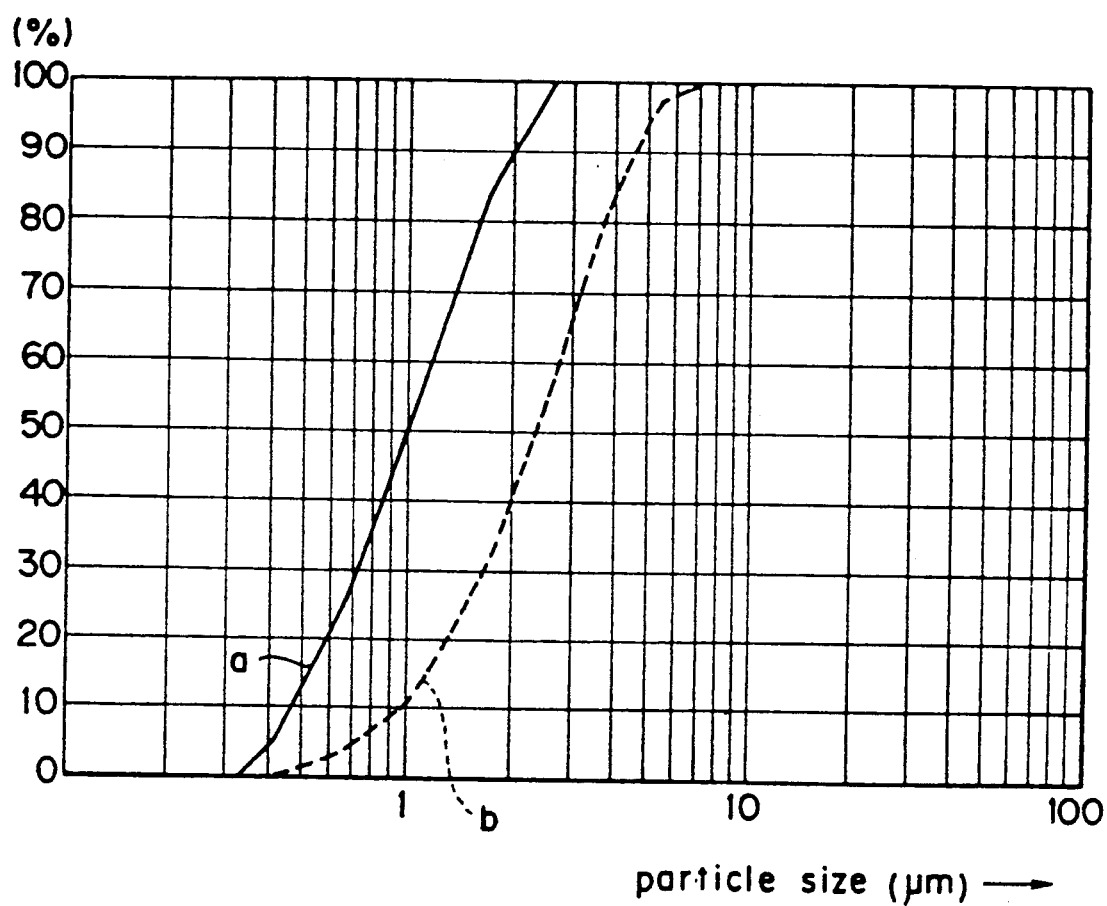
FIG. 1 is a diagram showing the results of measurements of the particle size distribution of the surface coating magnetic powder according to the present invention.

The alternating copolymer of polyoxyethylene allyl methyl diether and maleic anhydride is prepared according to the method shown by the following reaction scheme, which is known as disclosed in Japanese Patent Publication No. 31950/1970 (corresponding GB Patent Application No. 48106/66 (ICI), filed on Oct. 26, 1966).

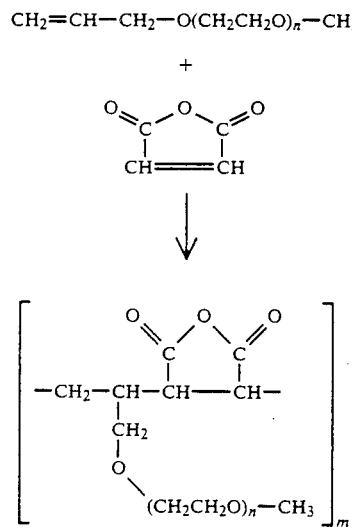

The polyoxyethylene allyl methyl diether to be used should desirably have a molecular weight of about 100 to 300,000, preferably about 1,000 to 20,000. The number m of repeating units may be 3 to 10,000, preferably about 6 to 100.

The surface coating of magnetic powder with the alternating copolymer of the present invention can be practiced according to any convenient method such as the ball mill method, the homomixer method, the sand mill method, the sonication method, etc., but particularly the sand mill method is a preferable method with respect to coating efficiency, etc.

In the present invention, the magnetic material subjected to the coating treatment is not particularly limited, but various magnetic materials known in the art can be used, as exemplified as $Fe_2O_3$, $\gamma$-$Fe_2O_3$, high Hc type $\gamma$-$Fe_2O_3$ ($Fe_3O_4$), Co-containing $\gamma$-$Fe_2O_3$, Co-coated $\gamma$-$Fe_2O_3$, ferrite ($M_xFe_{3-x}O_4$): M is the first transition metal such as Zn, Ni, Mn, Cr, Cd, etc.; x is 0 to 1), barium ferrite, etc. The particle size of the magnetic powder may be in the range of about 0 $\mu$m to 0.5 $\mu$m, and those within the range conventionally used in the magnetic recording medium of the prior art can be used as such.

The mixing ratio of these magnetic powder and coating agent may be preferably within the range of 1 to 2% by weight of the coating agent per 10% by weight of the magnetic powder in terms of weight ratio.

Also, by oxidizing ferrous ions in the co-presence of the coating agent, or ferrous ions in an aqueous solution containing ferrous ions and metal ions of M (=Zn, Ni, Mn, Cr, Cd) with air, hydrogen peroxide, nitrate ions, nitrite ions, etc. (temperature 20° to 80° C., pH about 6.6 to about 11), $Fe_2O_3$ or $M_xFe_{3-x}O_4$ (x is 0 to 1) can be coated.

Even if the maleic anhydride portion of the coating agent may be partially hydrolyzed, it has no influence on the coating ability.

The magnetic powder subjected to the above surface coating to be used in the present invention exhibits a hydrophilic property, and therefore it can be dispersed in water as described above to make an aqueous coating material. In the aqueous coating material containing the magnetic powder, suitable binder, hardener, lubricant, plasticizer, surfactant, antistatic agent, polishing agent, etc. can be conveniently added and mixed depending on the use, but one of the specific features in the present invention is to use a binder solution composed mainly of an acrylic resin and water.

The aqueous coating material containing magnetic powder to be used in the present invention should be preferably formulated at a ratio of acrylic resin to water of 30:70 to 50:50. In the case where the water amount is small at a ratio less than 30:70, there is the problem that water can be vaporized with difficulty to make drying difficult. While at a ratio higher than 50:50, due to excessive acrylic resin, there is the problem that the magnetic powder in the magnetic layer is reduced to render it difficult to obtain a high density.

A part of the above water can be replaced with ethyl alcohol, whereby drying time can be shortened.

The above coating material is applied on the substrate surface to a thickness of about 3 $\mu$m according to the methods as mentioned below, and, after drying, applied with a calendering treatment to make the surface smooth.

(1) The knife coater system, in which coating is performed by utilizing the gap between the knife and the base;

(2) The reverse roll coater system in which the rotation directions of several rolls are utilized;

(3) The gravure roll coater system in which a gravure coating having an impression mark on the surface is utilized; etc.

In the present invention, as the substrate, for example, a tape substrate such as polyester film, etc. may be employed, and a magnetic recording medium is produced as a magnetic recording tape or floppy disc.

The coating magnetic powder obtained by the present invention exhibits good dispersibility in an aqueous solution and exhibits excellent characteristics as the magnetic powder to be used for magnetic recording medium.

Also, since high dispersibility of magnetic powder as an aqueous coating material can be ensured, improvement of the working environment, alleviation of waste-liquor disposal instruments, etc. can be rendered possible, whereby there are the effect of reduction of the product cost of the magnetic recording medium and improvement of the environment.

Further, in the present invention, the thickness of the magnetic layer coated on the substrate can be made extremely thin, and the magnetic powder can be highly filled and oriented, and therefore there is the effect that a high density magnetic recording can be obtained.

Particularly, by use of the aqueous coating material of the present invention, there is the effect that a recording medium exhibiting excellent magnetic recording characteristics with an angular ratio of 0.9 or higher can be realized.

The present invention is described below by referring to Examples and Test examples.

REFERENCE EXAMPLE 1

In toluene (500 ml, 80° C.), 500 g of a polyoxyethylene allyl methyl diether [$CH_2=CHCH_2-O-(CH_2CH_2O)_{32}-CH_3$] (Monomer I) and 42 g of maleic anhydride (Monomer II) were subjected to alternating copolymerization with the use of benzoyl peroxide as the polymerization initiator to prepare 530 g of a coating agent.

EXAMPLE 1

The coating agent (100 g) prepared in the above Reference example 1 and 30 g of Co-coated $\gamma$-$Fe_2O_3$ (acicular crystal, 0.25 $\mu$m × 0.02 $\mu$m, 1xr) were mixed with 700 ml of water and sufficiently dispersed by a sonicator, followed by heating at 95° C. for 1 hour. During heating, treatment was conducted for several times with the sonicator. Next, the pH of the reaction mixture was raised to 9 with an aqueous alkali (NaOH) solution, and further the pH was dropped to 7 with hydrochloric acid.

Then, the reacted coating agent was removed by certification, followed by thorough washing with water to obtain 36 g of coating magnetic powder (this coating magnetic powder is hereinafter called ITT-K3) (coating amount of the coating material: 17 wt. %).

The magnetic powder obtained (ITT-K3) was observed by an electron microscope to confirm that no crystal was destroyed at all and no magnetic agglomeration occurred.

Next, the above coating magnetic powder (ITT-K3) was added into each of water, acetone, methanol, ethanol, dioxane, N,N-dimethylformamide, dimethyl sulfoxide, benzene, toluene, chloroform, dichloromethane, carbon tetrachloride, 1,1,1-trichloroethane, trichloroethylene, perchloroethylene for observation of dispersibility. As the result, it was found to be stably dispersed, and no change in particle size distribution was observed for 24 hours.

Confirmation of dispersibility was conducted by examining the particle distribution with a lapse of time by means of a centrifugal sedimentation system fluid distribution measuring device (SA-LP3, Shimazu Seisakusho).

The magnetic characteristics of the magnetic powder used in this Example were measured before and after coating to give the results shown in the following Table 1.

TABLE 1

(Magnetic characteristics of ITT-K3)

| Sample name | ITT-K3 | Comparative example (nontreated) |
|---|---|---|
| Characteristics of powder | | |
| Hc (Oe) | 620 | 620 |
| σs (emu/g) | 80 | 79 |
| r/s | 0.46 | 0.45 |
| BET (m²/g) | 22 | 36 |

TABLE 1-continued (Magnetic characteristics of ITT-K3)

| Sample name | ITT-K3 | Comparative example (nontreated) |
|---|---|---|
| $Fe^{II}$ (wt %) | 3.6 | 4.4 |

EXAMPLE 2

Coating magnetic powder was prepared in the same manner as in Reference example 1 and Example 1 except that the magnetic powder in Example 1 was changed to Co-containing $\gamma$-$Fe_2O_3$ (acicular crystal), 0.3 $\mu$m × 0.03 $\mu$m). This product exhibited excellent dispersibility and magnetic characteristics similarly as the coating magnetic powder of Example 1.

EXAMPLE 3 TO 5

The coating agent (80 g) prepared in the above Reference example 1, each of 30 g of $Fe_3O_4$ (particle size of about 0.3 $\mu$m) (Example 3), 30 g of $\gamma$-$Fe_2O_3$ standard size (particle size of about 0.6 $\mu$m) (Example 4) and 30 g of $\Gamma$-$Fe_2O_3$ fine particulate type (particle size of about 0.4 $\mu$m) (Example 5) and 500 ml of water were mixed together and sufficiently dispersed by a sonicator, followed by heating at 95° C. for about 1 hour. Next, the pH of the reaction mixture was raised to 9 with an aqueous alkali solution (NaOH), and further the pH was dropped to 7 with hydrochloric acid.

Then, the unreacted coating agent was removed by centrifugation, followed by purification by thorough washing with water, to obtain 34 g, 33 g and 33.5 g of coating magnetic powder, respectively.

The coating magnetic powder obtained was observed by an electron microscope to confirm that no crystal was destroyed at all and no magnetic agglomeration occurred.

Next, each of the above coating magnetic powders was added into each of an aqueous solution, acetone, methanol, ethanol, dioxane, N,N-dimethylformamide, dimethyl sulfoxide, benzene, toluene, chloroform, dichloromethane, carbon tetrachloride, 1,1,1-trichloroethane, trichloroethylene, percloroethylene for observation of dispersibility. As the result, it was found to be stably dispersed, and no change in particle size distribution was observed for 24 hours.

Dispersibility was confirmed similarly as in Example 1.

EXAMPLE 6

When the coating magnetic powder was prepared in the same manner as in Example 3 except for changing the magnetic powder in Example 3 to each of $Fe_3O_4$ having an average particle size of 10.2 $\mu$m, 0.05 $\mu$m and 0.01 $\mu$m, and barium ferrite ($BaFe_{12}O_{19}$) having an average particle size of 0.1 $\mu$m, coating magnetic powder having similarly excellent dispersing characteristic and magnetic characteristics was obtained.

This could be used as a magnetic aqueous coating material with good dispersibility.

DISPERSIBILITY TEST EXAMPLE 1

The mixing ratio of magnetic powder to coating agent was tested as follows.

Magnetic powder ($Fe_3O_4$: particle size 0.2 to 0.4 $\mu$m) was surface coated with an alternating copolymer of polyoxyethylene allyl methyl diether and maleic anhydride (molecular weight of polyoxyethylene allyl methyl diether 1,524, recurring units 8), and 3 kinds of samples with the ratio of magnetic powder (M) to coating agent (Q) of 1:2, 1:0.2 and 1:0 (namely no surface coating) were prepared.

Surface coating was performed by use of a sand grinder (⅛ G sand grinder BSG ⅛) (produced by Igarashi Kikai K.K.) under the grinding conditions of 2,000 rpm and 15 minutes.

Measurement of dispersibility was conducted by adding each of the above samples into an aqueous solution and 50% of the measured value by a laser system particle distribution measuring machine (produced by Shimazu Seisakusho) was used. The results are shown in FIG. 1.

In FIG. 1,
a represents M:Q=1:0.2 and
b represents M:Q=1:0; wherein
M is a Co-coated $\gamma$-Fe$_2$O$_3$ and
Q is an alternating copolymer comprising polyethylene allyl methyl diether and maleic anhydride.

From the results in this Figure, the sample subjected to surface coating (M:Q=1:0.2) exhibited higher dispersibility by 2-fold or more as compared with the sample subjected to no surface coating.

DISPERSIBILITY TEST EXAMPLE 2

Magnetic powder subjected to surface coating was prepared in the same manner as in Dispersibility test 1 except for changing the magnetic powder to Co-containing $\gamma$-Fe$_2$O$_3$ (particle size 0.3 to 0.4 $\mu$m), and its dispersibility in aqueous solution was tested. As the result, dispersibility of 2-fold or higher as compared with the sample subjected to no surface coating was similarly exhibited.

EXAMPLE 7

An amount of 12.5 Grams of magnetic powder (Co-containing $\gamma$-Fe$_2$O$_3$: particle size 0.3 to 0.4 $\mu$m, coercive force HC: 659 Oe, BET (m$^2$/g): 31.9, bulk density (g/ml): 0.70, Fe(%): 3.5), 1.25 g of a coating agent of an alternating copolymer (repeating units 8) of a polyoxyethylene allyl methyl diether (molecular weight 1,524) with maleic anhydride and 100 g of an aqueous binder liquid (acrylic resin and water: formulation ratio 40:60% by weight) were filled into a cell for the sand grinder (as described above) (about 400 cc) in the order of the coating agent, the binder liquid, 20 g of glass beads for stirring (particle size: about 1.5 mm) and the magnetic powder, and blades for grinding were inserted into the mixture and further 155 g of glass beads were added thereabove, followed by stirring at 2,000 rpm for 15 minutes. After stirring, the glass beads were removed to give about 10 g of an aqueous coating material containing magnetic powder.

The aqueous coating material containing magnetic powder was applied on one surface of a polyester film for magnetic tape (thickness 12 $\mu$m) by means of a knife coater system coating machine (produced by Yasui Seiki K.K.) with a width between the knife and the base of 15 $\mu$m, permitted to pass through a magnetic field of about 3200 G to orient the particles and dried in hot air (about 50° C.) to form a magnetic layer, thus obtaining a magnetic recording medium by use of an aqueous coating material. The magnetic layer obtained had a thickness of about 10 $\mu$m when wet as coated, and about 3 to 5 $\mu$m after drying.

The surface of the magnetic recording medium obtained was found to have luster, and also without peeling by the scratching test with a nail, thus exhibiting high adhesiveness.

Figure 2:
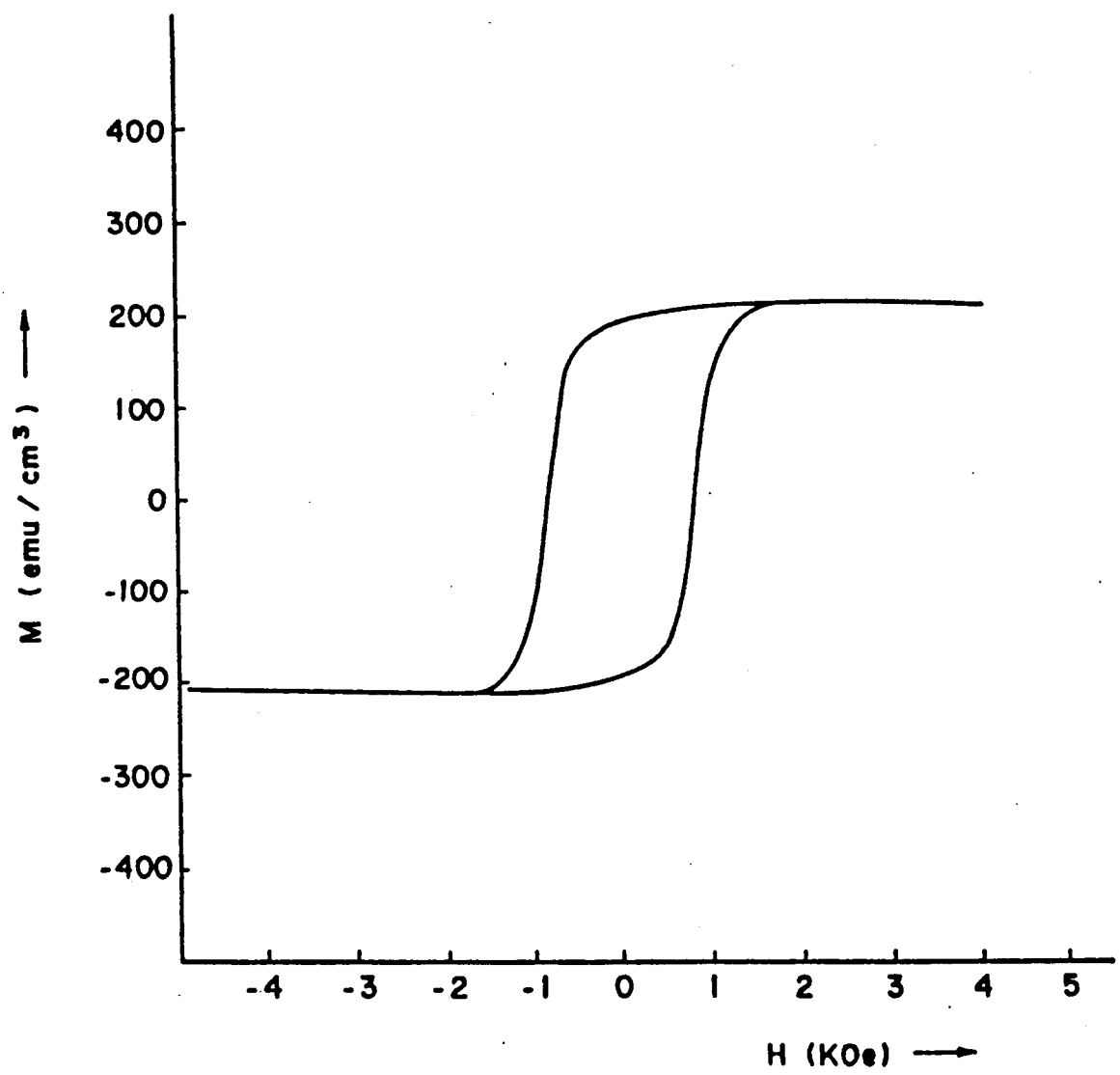
FIG. 2 is a diagram showing the results of measurements of the angular ratio of the magnetic recording medium prepared in Example 1.

Also, as the result of magnetic measurement by a vibrating sample type magnetometer Model BHV-55 (produced by Riken Denshi K.K.), it was confirmed to have extremely high values of an angular ratio of 0.096 (as the angular ratio is nearer to 1, it shows that the magnetic particles are arranged more uniformly and at a higher density on the film surface) and a coercive force of 820 Oe as shown in FIG. 2. Thus, it was found to be very suitable for industrialization.

EXAMPLE 8

The surface coating agent of Example 7 (2.5 g), 50 ml of water and 20 g of glass beads were filled in a cell for a sand grinder, then blades were inserted and further 25 g of magnetic powder and 155 g of glass beads were added, followed by stirring at 2,000 rpm for 15 minutes. Then, the mixture was spread broadly in a pad and dried at about 40° to 45° C. overnight to obtain magnetic powder subjected to surface coating.

Next, 13.75 g of the magnetic powder subjected to surface coating and 100 g of an aqueous binder liquid (acrylic resin and water: formulation ratio was 40:60 in terms of % by weight) were filled in a cell, the blades were inserted and 175 g of glass beads were added, followed by stirring at 2,000 rpm for 15 minutes to prepare an aqueous coating material containing magnetic powder.

The aqueous coating material containing magnetic powder was similarly coated as in Example 7 and its characteristics were measured to give substantially the same results as in Example 7.

EXAMPLE 9

When a magnetic recording medium was prepared in the same manner as in Example 7 except for using an aqueous binder (acrylic resin+water+ethyl alcohol: acrylic resin: water:ethyl alcohol=40:30:30 in terms of % by weight) in place of the aqueous binder liquid in Example 7, substantially the same results as in Example 7 were obtained.

In this Example, drying after coating and orientation of the magnetic powder was easier as compared with Example 7.

USE EXAMPLE

By coating of the magnetic powder obtained in Example 1 (ITT-K3) on the surface of a support as described below, a magnetic recording medium was prepared. Its magnetic characteristics were examined and the results are shown below in Table 2.

PREPARATION OF MAGNETIC RECORDING MEDIUM

By use of 7 g of a binder (copolymer of vinyl chloride and vinyl acetate:butadiene-acrylontrile rubber=5:1), 25 g of magnetic powder and 68 g of solvents (toluene:-methyl ethyl ketone:isobutyl ketone=1:2:2 in terms of % by weight) as the magnetic coating material (mill base), it was applied on the polyethylene terephthalate surface according to the doctor blade method.

TABLE 1

| Sample name | ITT-K3 | Comparative example (nontreated) |
| --- | --- | --- |
| Characteristics of coating film | | |
| Hc (Oe) | 710 | 650 |

TABLE 1-continued

| Sample name | ITT-3 | Comparative example (nontreated) |
|---|---|---|
| Rs | 0.88 | 0.80 |
| Gloss | 93 | 86 |
| Film thickness (μm) | 3.3 | 3.6 |

From the above results, a lowering of specific surface (BET) by coating can be confirmed in this Example, and also it can be understood that good magnetic characteristics can be obtained.

Further, as is apparent from the results in Table 2, it can be understood that the magnetic characteristics of the magnetic recording medium prepared by use of said coating magnetic powder (ITT-K3) have an extremely high Rs value which is excellent for a magnetic recording material.

We claim:

1. A magnetic powder treated with a coating agent on it surface to coat the surface of said powder, said coating agent comprising an alternating copolymer of a polyoxyethylene allyl methyl diether and maleic anhydride.

2. A magnetic powder treated with a coating agent according to claim 1, wherein the alternating copolymer is represented by the formula

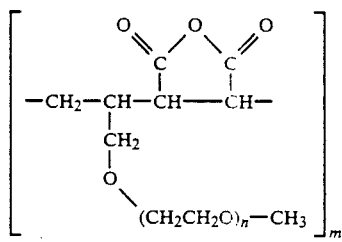

and the polyoxyethylene allyl methyl diether has a molecular weight of 100 to 300,000.

3. The magnetic powder treated with a coating according to claim 2, wherein the molecular weight is 1,000 to 20,000.

4. The magnetic powder treated with a coating agent according to claim 2, wherein m is 3 to 10,000.

5. The magnetic powder treated with a coating agent according to claim 2, wherein m is 6 to 100.

6. The aqueous coating material according to claim 2, wherein the polyoxyethylene allyl methyl diether is $CH_2=CHCH_2-O-(CH_2CH_2O)_{32}-CH_3$ and the magnetic powder is Co-coated $\gamma$-$Fe_2O_3$.

7. The magnetic powder treated with a coating agent according to claim 2, wherein m is 6 to 100, the magnetic powder is barium ferrite having a size of 0.1 μm to 0.5 μm and there is 1 to 2% by weight of the coating agent per 10% by weight of the magnetic powder.

8. A magnetic powder treated with a coating agent according to claim 1, wherein the magnetic powder is at least one selected from the group consisting of $\gamma$-$Fe_2O_3$, and ferrite.

9. The magnetic powder treated with a coating agent according to claim 8, wherein said ferrite is $M_xFe_{3-x}O_4$, wherein M is selected from the group consisting of Zn, Ni, Mn, Cr and Cd and x is 0 to 1.

10. A magnetic powder treated with a coating agent according to claim 1, wherein the magnetic powder is barium ferrite.

11. An aqueous coating material, comprising the magnetic powder according to claim 1 in a binder liquid composed mainly of an acrylic resin and water, wherein the ratio of the acrylic resin to the water is 30:70 to 50:50 in terms of % by weight.

12. A magnetic recording medium obtained by coating the aqueous coating material according to claim 11, on the surface of a substrate and drying the coated material.

13. The magnetic recording medium according to claim 12, wherein the magnetic recording medium is a magnetic tape or a magnetic floppy disc.

14. The magnetic recording medium according to claim 12, wherein the substrate comprises polyethylene terephthalate.

15. The magnetic recording medium according to claim 12, wherein the substrate is a polyester film.

16. The aqueous coating material according to claim 11, wherein the ratio is 40:60.

17. The aqueous coating material according to claim 11, wherein the binder comprises a copolymer of vinyl chloride and vinyl acetate: butadiene-acrylonitrile rubber=5:1.

18. The magnetic powder treated with a coating agent according to claim 1, wherein the powder has a size of 0.1 μm to 0.5 μm.

19. The magnetic powder treated with a coating agent according to claim 18, wherein there is 1 to 2% by weight of the coating agent per 10% by weight of the magnetic powder.

20. The magnetic powder treated with a coating agent according to claim 1, wherein the magnetic powder is at least one selected from the group consisting of high Hc type $\gamma$-$Fe_2O_3$, Co-containing $\gamma$-$Fe_2O_3$, Co-coated $\gamma$-$Fe_2O_3$ and barium ferrite.

* * * * *